Figure 1:
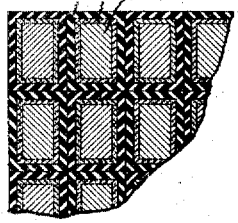

F. W. PEEK, Jr.
PROTECTION OF ELECTRICAL APPARATUS.
APPLICATION FILED NOV. 30, 1914.

1,235,373.  Patented July 31, 1917.

WITNESSES:  INVENTOR:
  FRANK W PEEK, JR
  BY
  HIS ATTORNEY.

UNITED STATES PATENT OFFICE.

FRANK W. PEEK, JR., OF SCHENECTADY, NEW YORK, ASSIGNOR TO GENERAL ELECTRIC COMPANY, A CORPORATION OF NEW YORK.

PROTECTION OF ELECTRICAL APPARATUS.

1,235,373.	Specification of Letters Patent.	Patented July 31, 1917.

Application filed November 30, 1914. Serial No. 874,757.

*To all whom it may concern:*

Be it known that I, FRANK W. PEEK, Jr., a citizen of the United States, residing at Schenectady, county of Schenectady, State of New York, have invented certain new and useful Improvements in Protection of Electrical Apparatus, of which the following is a specification.

My invention relates to line insulators, cables, bushings, electrical windings and substantially all other electrical apparatus likely to be affected by abnormally high frequencies; it is particularly applicable to electrical windings wherein high frequencies are likely to build up disastrously high voltages through resonance. The object of my invention is to protect electrical apparatus against the effects of abnormally high frequencies by providing such apparatus with means, preferably distributed throughout the apparatus, for harmlessly absorbing considerable of the abnormally high frequency energy.

In protecting electrical apparatus I prefer to use alternate layers of an energy absorbing material and a good dielectric, preferably disposed between the various conducting portions thereof; preferably also these alternate layers are uniformly distributed throughout the apparatus, but they may be located irregularly or only between larger sections of the apparatus if other considerations so dictate or any such disposition is sufficient in any particular case. Thus in an electric winding the alternate layers are preferably disposed between the turns thereof or between groups of turns. The good dielectric may be, and preferably at least takes the place of, the usual insulation between the turns or conductors; the absorbing material is designed particularly to absorb so much of the energy which passes into the dielectric at high frequencies as the so-called displacement current, that not enough of a dangerously high frequency is available to do material damage, either by building up high voltages in resonating portions of the apparatus, or otherwise; at the same time this loss at normal frequencies may be so low as not to be prohibitive, the total displacement current depending as it does on the frequency.

The insulating and energy absorbing materials may be physically separate and separately applied, or they may be partially or wholly embodied in the same structure. Where they are entirely separate, the dielectric may be any suitable insulating material, and the energy absorbing material may be either a very high resistance conductor as coke and other forms of carbon, carborundum, boron, etc., or a dielectric of high losses per cycle of which asbestos is an example. If necessary, the energy absorbing material may be held together by a suitable binder as cement, varnish, etc. Where the insulating and energy absorbing materials are embodied in the same structure it may assume various forms. Among these are pasted mica containing a pronounced amount of alcohol, that is, mica sheets or tapes built up of small mica scraps pasted together with a varnish and in which a considerable amount of the alcohol of the varnish is retained in the completed material; the alcohol in this case acts as the energy absorbing material. Altogether, the materials and the forms which they may assume cover very wide ranges.

An important feature of my invention which is of general application in the protection of electrical apparatus against high frequencies, is the distribution of energy absorbing means throughout the apparatus, or portion of the apparatus, to be protected. To this feature of my invention it is immaterial, speaking broadly, whether the energy absorbing means is of the type I have herein disclosed or of some other type, though this novel energy absorbing means is particularly and peculiarly adapted to embody this feature. If, as heretofore, an energy absorbing means is electrically related to a winding at but a comparatively few points throughout its length, it seems impossible in practice to take care of all possible disturbances and conditions. With my invention, however, no such difficulties are encountered either in windings or other apparatus, for with the energy absorbing means distributed throughout every portion of the apparatus where high frequency disturbances can possibly occur, so that it is related to substantially every part thereof, it is always present at the proper points to perform the functions expected of it, and the novel absorbing means which forms a part of my invention is peculiarly adapted for such distribution.

Figure 2:
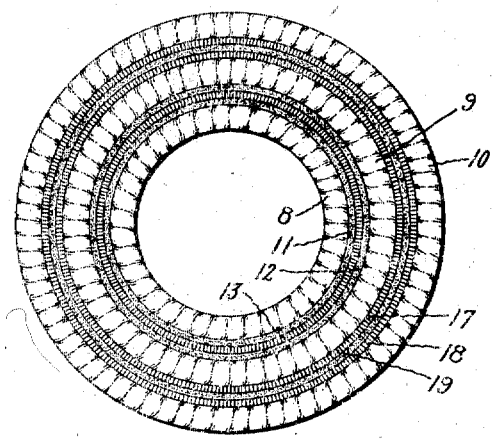
Figure 3:
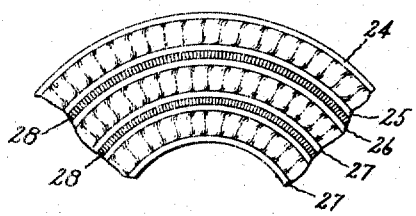

Since, as indicated above, my invention is applied in substantially the same way to all electrical apparatus for which it is suitable, I shall, for the sake of simplicity, describe in detail only its embodiment in electrical windings, from which embodiment its application to all other apparatus will be readily understood. In the accompanying drawings which form a part of this specification, Figure 1 represents a section through a portion of an electrical winding embodying my invention; Fig. 2 is an elevation of an electrical coil or winding and Fig. 3 is an elevation of a portion of another electrical coil or winding, in both of which my invention is embodied in various ways.

Fig. 1 illustrates a preferred embodiment of my invention in an electrical winding, the absorbing means being uniformly and thoroughly distributed throughout the apparatus. The conductors or turns 1 are each surrounded by the energy absorbing material 2 which in turn is surrounded by insulating material 3. In such an application as this the energy absorbing material and the good dielectric may be any of those materials having respectively the requisite characteristics, and may be physically separate and separately applied.

As will be understood, a certain amount of energy passes into or from the insulation between each two turns during each variation of the energy in the winding, and other things being equal, the total amount of energy passing into and from the insulation at a given point in a given time, is proportional to the number of alternations or other variations within that time. This energy passing between each two conductors is, of course also proportional to the dielectric capacity of the insulation 3 and the resistance of the absorbing material 2; with each passage of energy, some is absorbed by the material 2. The alternate layers may be designed to entail no undue losses at the commercial operating frequencies but at the same time to absorb so much total energy at abnormally high frequencies as to substantially prevent any dangerous conditions likely to arise from the abnormally high frequencies.

Either in addition to thoroughly distributing the alternate layers of insulating material and absorber throughout the apparatus, as indicated in Fig. 1, or without such thorough application of my invention, my invention may be applied between larger portions of any apparatus as is illustrated in Fig. 2. In the figure is illustrated a coil divided into three sections 8, 9 and 10, each comprising a number of turns. My invention is illustrated in this figure as applied between each two of these sections. Two forms of the specific application of my invention are illustrated. Between the sections 8 and 9 are located two layers 11 and 12 of the energy absorbing material and between them a single layer of good dielectric insulating material 13. Between the sections 9 and 10 there are two layers of good dielectric insulating material 17 and 18 with a single layer of the energy absorbing material 19 between the insulations. The operation of my invention in both of these cases is the same as that indicated with reference to the structure of Fig. 1; that is, the energy absorbing material absorbs energy from the displacement current through the insulating materials. In a fashion in this case too, the energy absorber is uniformly distributed through the coil of this Fig. 2 in that it is disposed between substantially similar sections of the coil.

In Fig. 3 the coil is provided with metallic plates 24, 25, 26 and 27 for electrostatically distributing the field in a well known manner or for other purposes. Between each two adjacent plates, as for example, between the plates 25 and 26 is located the insulating and absorbing materials which in this particular case are combined into a single structure 28. This may be, for example, as pointed out above, sheet pasted mica containing a pronounced amount of alcohol. The operation of this embodiment of my invention is similar to those heretofore described.

It will be understood that while I have described a number of forms embodying my invention, my invention is not limited to these forms nor limited to these particular forms in their illustrated relations to each other and to the various forms of apparatus. Still further, as indicated above, my invention is not limited to electrical windings but is of general application to many other electrical devices; the application to other devices, however, it is needless to describe since those applications are substantially similar to the applications I have described and will be readily understood therefrom.

While I have described the principle of my invention and the best mode I have contemplated for applying it, other modifications will occur to those skilled in this art, and I aim in the appended claims to cover all modifications which do not involve a departure from the spirit and scope of my invention.

What I claim as new and desire to secure by Letters Patent of the United States, is:—

1. In an electrical winding, alternate layers of insulating means and means for absorbing energy from the displacement currents therethrough, disposed between portions of the winding to protect the winding against the effects of abnormally high frequencies.

2. In an electrical winding, insulating means between the turns thereof and means distributed throughout the winding for absorbing energy from the displacement currents through said insulating means to protect the winding against the effects of abnormally high frequencies.

3. In an electrical winding, alternate layers of insulating means and means for absorbing energy from the displacement currents through said insulating means, disposed between the turns thereof to protect the winding against the effects of abnormally high frequencies.

4. In an electrical winding, alternate layers of insulating means and high resistance conducting means disposed between portions of the windings to protect the winding against the effects of abnormally high frequencies.

5. In an electrical winding, alternate layers of insulating means and high resistance conducting means distributed throughout the winding between the turns thereof to protect the winding against the effects of abnormally high frequencies.

6. In a portion of an electrical winding, energy absorbing means distributed throughout that portion between the turns thereof to protect the winding against the effects of abnormally high frequencies.

7. The combination of two electrically conducting parts, and alternate layers of insulating means and means for absorbing energy from the displacement currents disposed between said conducting parts to protect said parts against the effects of abnormally high frequencies.

8. The combination of two electrically conducting parts and alternate layers of insulating means and means for absorbing energy from the displacement currents distributed between said conducting parts to protect said parts against the effects of abnormally high frequencies.

9. The combination of two electrically conducting parts, and alternate layers of insulating means and high resistance conducting means disposed between said conducting parts to protect said parts against the effects of abnormally high frequencies.

10. The combination of two electrically conducting parts arranged adjacent each other and energy absorbing means distributed between said conducting parts to protect said parts against the effects of abnormally high frequencies.

11. In electrical apparatus, energy absorbing means distributed throughout the apparatus between the conducting parts thereof to protect said parts against the effects of abnormally high frequencies.

In witness whereof, I have hereunto set my hand this 28th day of November, 1914.

FRANK W. PEEK, Jr.

Witnesses:
HELEN ORFORD,
MARGARET E. WOOLLEY.